Sept. 3, 1940.　　　　　E. J. LUECK　　　　　2,213,711
APPARATUS FOR SUBJECTIVE OPTICAL TESTING
Filed Jan. 25, 1938　　　5 Sheets-Sheet 1
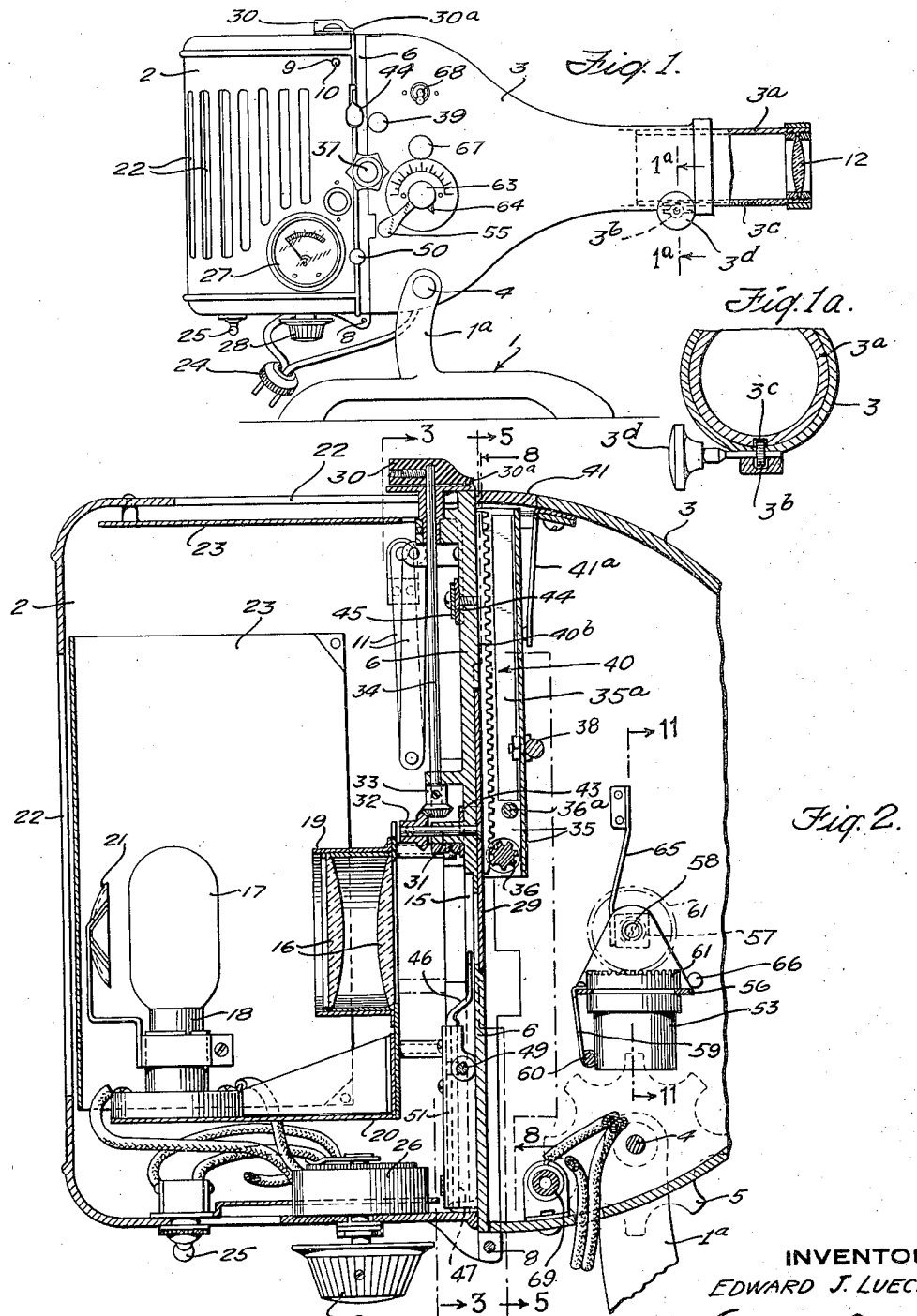
INVENTOR
EDWARD J. LUECK
BY
ATTORNEY

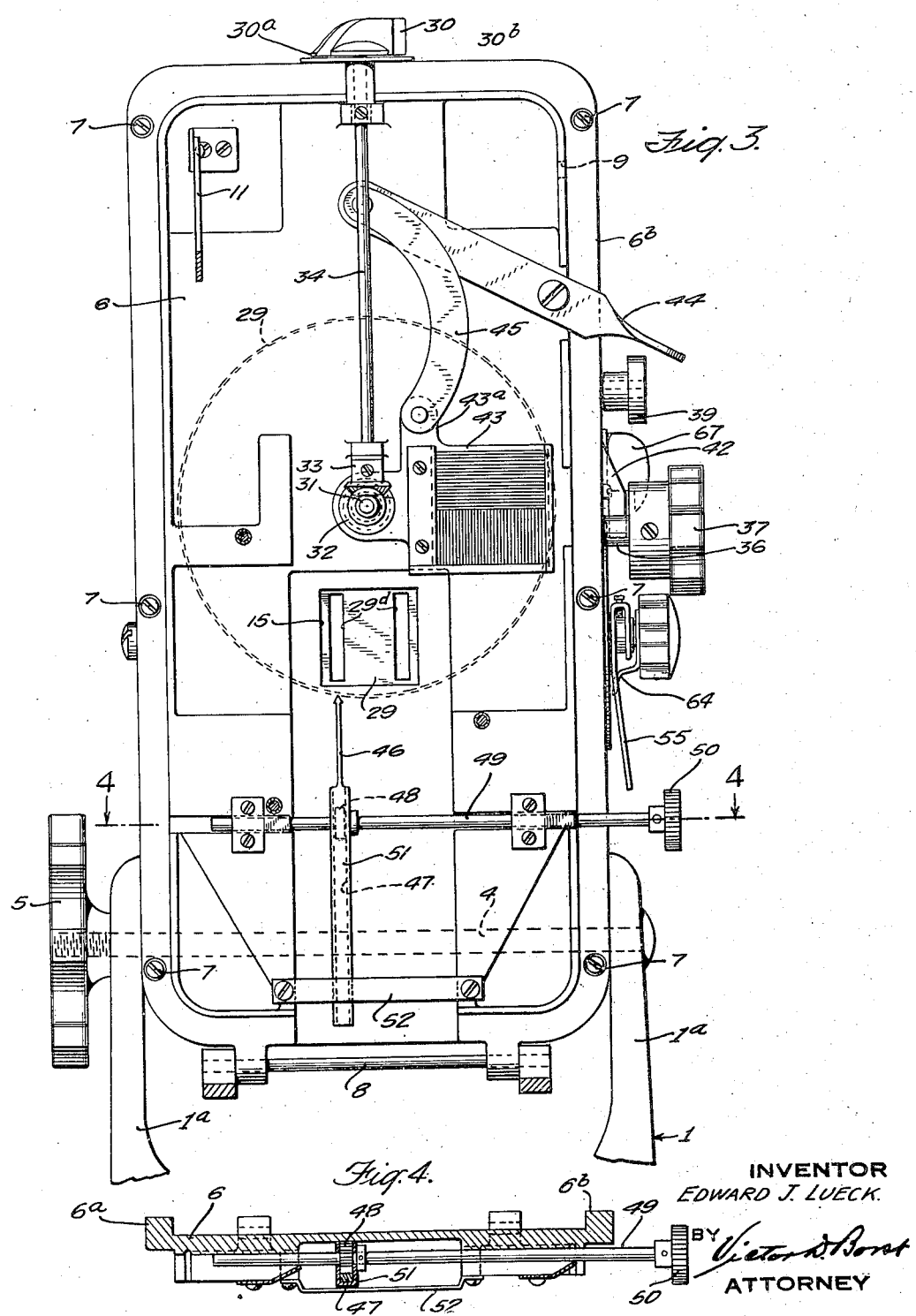

Sept. 3, 1940.　　　　　E. J. LUECK　　　　　2,213,711
APPARATUS FOR SUBJECTIVE OPTICAL TESTING
Filed Jan. 25, 1938　　　5 Sheets-Sheet 3

INVENTOR
EDWARD J. LUECK.
BY
ATTORNEY

Sept. 3, 1940.  E. J. LUECK  2,213,711
APPARATUS FOR SUBJECTIVE OPTICAL TESTING
Filed Jan. 25, 1938  5 Sheets-Sheet 4
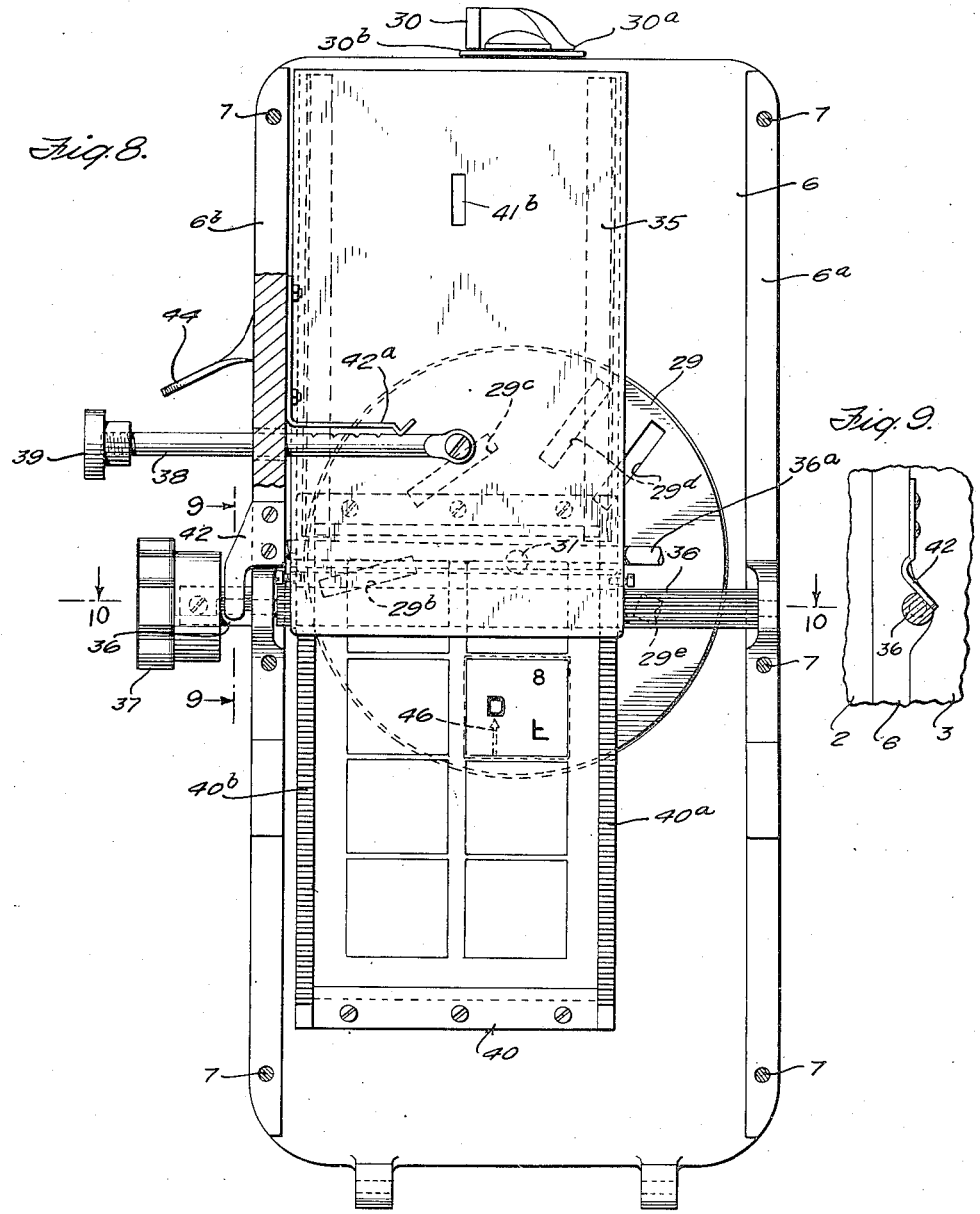
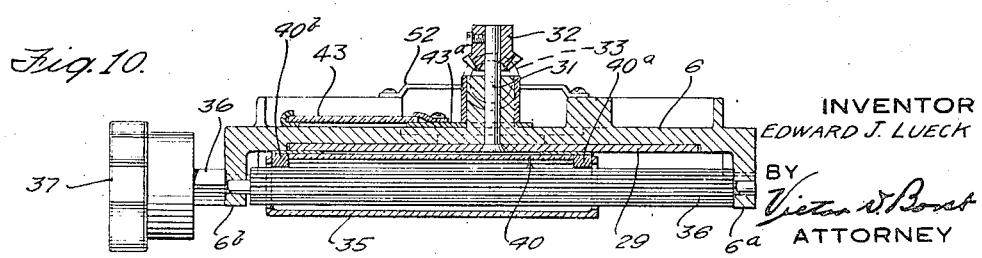
INVENTOR
EDWARD J. LUECK
BY
ATTORNEY

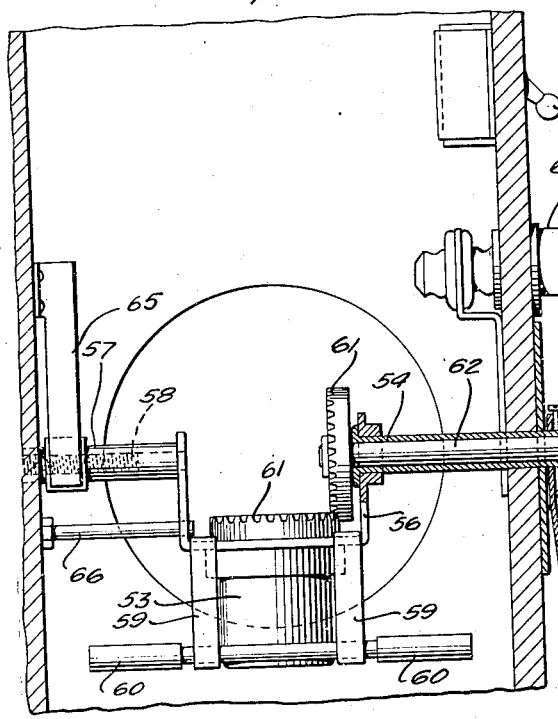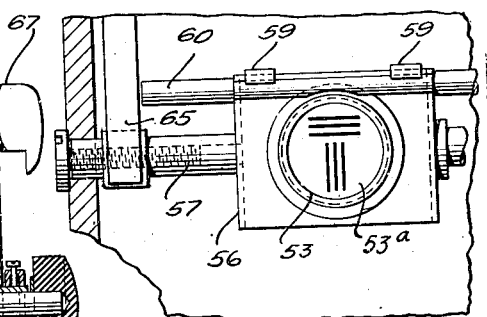

Patented Sept. 3, 1940

2,213,711

UNITED STATES PATENT OFFICE 2,213,711

APPARATUS FOR SUBJECTIVE OPTICAL TESTING

Edward J. Lueck, Geneva, N. Y., assignor to Shuron Optical Company, Inc., a corporation of New York Application January 25, 1938, Serial No. 186,788

10 Claims. (Cl. 88—20)

My invention refers generally to the art of optical test charts such as are used in subjective tests to determine the visual acuity of patients, and more particularly to the projection type of such apparatus in which the charts or selected characters therefrom are thrown on a screen by a projection lens system.

One of the objects of the invention is to extend the range of possible tests and the accuracy of results of such apparatus. Another object is to facilitate the use of apparatus of this character. Other general objects are economy of size and of cost and durability of construction. Still other objects and advantages will appear from the following exposition of the invention.

Embodiments of the invention are complete and self contained. The essential parts are built permanently into the apparatus including the stops, shutters, and multicolored screens, and are easily and precisely manipulated. Means are provided to adjust the projection slide containing the charts laterally as well as longitudinally, thereby multiplying the possible number of charts with a given length of slide and shortening the necessary length of the slide holder, an advantage readily apparent from comparison with devices of this character heretofore in use.

Extension of the range and accuracy of tests is effected by means of a rotative astigmia test chart and by the provision of means to vary the illumination and hence the perceptibility of the projected image.

More specifically the invention contemplates the use of an externally operable rotary shutter having proper apertures to enable the practitioner to select the characters to be projected on the screen either individually or in rows, vertical or horizontal. The two color screen commonly used in the final test is also permanently mounted in the housing for easy manipulation to bring it into and remove it from the light path. There is also permanently mounted in the housing a revolvable astigmia test chart arranged to be brought into the path of the light in advance of the focusing lenses and to be removed therefrom and to be rotated by external operating means.

Other features of the invention will appear from the following description. I shall now describe the illustrated embodiment of my invention and shall thereafter point out my invention in claims.

Fig. 1 is a side elevation of one embodiment of the invention.

Fig. 1a is a sectional detail on line 1a—1a of Figure 1.

Fig. 2 is a longitudinal sectional elevation of the housing with the exception of the front end.

Fig. 3 is a transverse section on the broken line 3—3 of Figure 2.

Fig. 4 is a detail sectional plan on line 4—4 of Figure 3.

Fig. 8 is a transverse section on the broken line 8—8 of Figure 2.

Fig. 9 is a sectional detail on line 9—9 of Figure 8.

Fig. 10 is a sectional plan on line 10—10 of Figure 9.

Fig. 11 is a detail of the astigmia test chart and operating parts, being taken on line 11—11 of Figure 2.

Fig. 12 is an elevation of the same parts moved to projecting position, as represented in Figure 13 where line 12—12 indicates the line of section.

Fig. 13 is a longitudinal section of the parts shown in Figure 12 with the addition of the lower end of the guide for the projection slide and of a slide contained therein.

Figures 5, 6, 7:
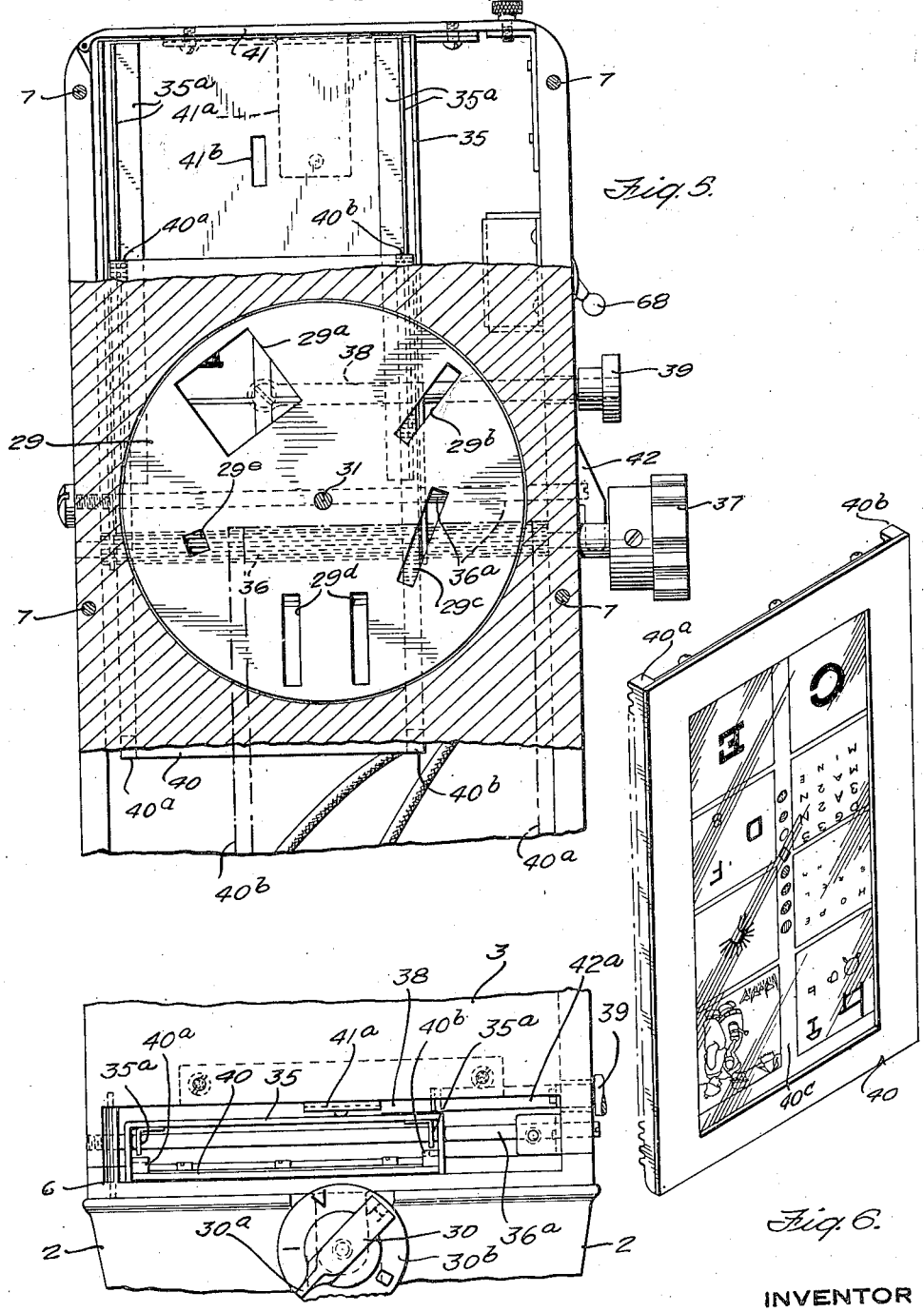
Fig. 5 is a transverse section on the broken line 5—5 of Figure 2.
Fig. 6 is a perspective of the projection slide holding the charts and shown in the relative position which it occupies in the device.
Fig. 7 is a fragmentary plan view of a portion of the top of the housing.

The optical chart projecting device is shown as mounted on a base 1 to go on a table, but as is usual with such devices it may be placed on a floor stand or other support. The housing is in two parts, the rear part or section 2 comprising the lamp chamber and the front part or section 3 comprising the projecting chamber. The legs 1a of the base 1 are pivotally connected to the projection chamber by means of a through pivot bolt 4 having on its threaded end a clamping nut 5 shaped for manual operation.

The two chambers of the housing are separably attached through the medium of a partition 6 which fits upon the end of the front section 3 and is removably secured thereto by screws 7, and to the bottom of which the rear section 2 hinges on hinge pin 8. A spring latch (not specifically shown) on the upper corner of the lamp chamber wall engages in hole 9 (Fig. 3) in the flange of the partition 6 to hold the rear section closed and is released by pressure on an externally protruding stud 10. Pivoted links 11 secured at one end to the partition and at the other end to the lamp chamber near its front edge, serve to limit the opening movement of the lamp chamber on its hinge.

The lamp and the condensing lenses are in the lamp chamber and the projection or focusing lenses are in the front end of the projection chamber. As shown, the focusing lenses 12 are disposed in the front end of a focusing tube 3a which telescopes into the front end of the projection chamber 3. This front end carries a pinion 3b supported by a bracket on its under side and entering through a slot into engagement with longitudinal rack 3c on the focusing tube. A knob 3d is provided for operating the pinion and thus adjusting the focusing tube to bring the image into sharp relief upon the screen.

In line with the axis of the tube 3a is a square aperture or window 15 in the partition 6 and immediately back of this aperture are the condensing lenses 16 and the light source 17.

The light source is preferably a prefocused lamp and the socket 18 for the lamp and the holder 19 for the condensing lenses are carried by an angular frame member 20 that is secured by screws and spacing sleeves to the rear face of the partition 6 in proper position to bring the optical axis of the condensing lenses in line with that of the focusing lenses. The lamp 17 is provided with a reflector 21 in the same axial alignment.

The walls of the lamp chamber are provided with ventilating openings 22 and proper shields 23 are provided on the inner face of the lamp chamber to prevent the escape of light, being properly spaced to afford ventilation.

An electric plug 24 which is suitably connected to a supply line provides electric current to the device. Two circuits branch off from this plug, one to the projection chamber and one to the lamp chamber. The branch to the lamp chamber connects with the base of the electric lamp socket through a switch 25, a rheostat 26 and a meter 27. The dial of the meter is exposed on the side of the rear chamber wall and is graduated in units to indicate the intensity of illumination on the screen at the prescribed distance, that is, the foot candles, or the candle power of the lamp or other unit as desired from which the degree of illumination may be deduced. The rheostat 26 has a knob 28 exposed on the under side of the casing for manual operation.

To regulate the size and shape of the effective opening afforded by the window 15 for the transmission of light a rotary shutter 29 is provided. This shutter is seated in a circular recess on the front or outer face of the partition 6 so that it is flush with the outer face and its center is disposed above the window 15 while its outer edge extends below the window, thereby effectively covering the window. Between its center and its edge the shutter is provided circumferentially with a series of variously shaped openings which can be successively brought into opposition to the window by the rotation of the shutter. As shown best in Fig. 5, these openings in the shutter 29 comprise a square opening 29a substantially the size of the window or aperture 15, a slot 29b parallel to a radius, a slot 29c at right angles to a radius, two slots 29d parallel to a radius and a small square aperture 29e.

For manual rotation of the shutter 29 it is operatively connected to a knob 30 on top of the lamp chamber. A pivot pin 31 at the center of the shutter extends rearwardly through the partition 6 and has on its rear end a bevel gear 32 which meshes with bevel gear 33 on the lower end of stem 34 the upper end of which is attached to the knob 30. The stem 34 bears in lugs on the rear face of the partition 6, and a pointer 30a on the knob 30 coacts with an index dial 30b which is secured to the top lug and in conjunction with the pointer indicates the position of the shutter.

To direct a slide before the window 15 in projecting position there is provided a slide holder and guide member 35 on the outer face of the partition 6. This guide member is channel shape in cross section with its open face toward the partition and has supplemental angle strips 35a on its inner face to restrain and guide the projector slide. An elongated transverse pinion 36 extends across the outer face of the partition 6 just above the window 15 and bears at its ends in bearings provided in flanges 6a and 6b along the respective longitudinal edges of the partition, the toothed portion of the pinion extending from flange to flange. A knob 37 on an extension of the pinion outside the housing provides means for manual operation of the pinion. Just above the pinion 36 and parallel therewith and below the lower ends of the guide strips 35a is a transverse guide rod 36a also supported in the flanges of the partition 6, and the guide member 35 is supported and slides laterally on this rod 36a, its side flanges being perforated to provide the bearings. The pinion 36 also extends through openings in the side flanges of the guide member 35, these latter openings being of sufficient size to clear the pinion so that the pinion when turned by the knob 37 does not engage the guide member.

To slide the guide member laterally upon the guide rod 36a there is provided a rod 38 which is secured to the outer face of the guide member and extends through a hole in the side wall of the casing. A knob 39 is provided on the outer end of this rod.

The form of projector slide used in the device is shown in Fig. 6. A frame 40 has eight charts therein which may bear test characters and figures as desired, and these charts are disposed in two longitudinal rows of four charts each. The front face of the frame 40 is provided along its longitudinal edges with racks 40a and 40b which racks engage with the pinion 36. The dimensions of the slide are such that it fits in the guide member 35 between the strips 35a.

In order to afford access to the guide member for insertion and removal of slides, an opening is provided in the top wall of the housing immediately over the guide member which is closed by a removable strip 41. This strip may be hinged at one end and be unsecured at its other end or secured in any suitable way as by a manual screw with a knurled end which engages with a tapped hole in an overhanging flange of an angle piece secured to the side wall of the front section 3 of the housing. The manner in which this opening gives access to the slide appears in Figure 7 where the strip 41 is shown removed.

A flat spring 41a depends from the top wall of the housing section 3 and bears against the outer face of the guide member 35 and holds the member against the partition 6. A rounded projection on the lower end of the spring is the bearing point and is adapted to snap into a slot 41b (Fig. 8) in the guide member 35 when the guide member is laterally in a central position. The purpose of this will later appear.

The teeth of the racks 40a and 40b engage with the pinion 36 and therefore the rotation of the knob 37 serves to raise and lower the slide to bring one or another of the four charts in either row opposite the window 15. The pinion is of such size that one complete rotation moves the slide just the distance between charts, and to facilitate locating the charts the extension of the pinion outside the housing has a flattened section (see Fig. 9) against which a spring 42 bears.

The slide is adjusted laterally by moving the knob 39 in or out. It is shown in Figure 8 with the right hand row as there viewed in the line of the window 15. If the knob 39 is pushed entirely in the left hand row is brought opposite the window. Notches on top of the rod 38 may be provided to cooperate with a spring detent 42a to enable the operator to move the charts laterally a stop at a time equal to the distance from one vertical row of characters to another in a single chart.

Colored spots may be provided in the projection chart. As shown a row 40c is arranged vertically in the center between the two vertical rows of individual charts. These spots are provided with various color screens, for example, red, yellow, orange, green, white, blue, and violet. These may be individually projected through the small opening 29e. When the round boss on the spring 41a is in the slot 41b the slide is centrally disposed for selective projection of these spots.

In the position of the shutter shown in Fig. 5 the two vertical slots 29d are opposite the window 15 and in the position shown in Fig. 8 the shutter is adjusted so as to bring the square opening 29a opposite the window. The individual charts are substantially of the size of the window and of the opening 29a. Therefore in the position shown in Fig. 8 the entire chart will be projected on the screen. By using the two vertical slots 29d the refractionist is able to project two vertical rows of characters on the screen. With the slot 29c he selects a horizontal row and with the opening 29b he selects a single vertical row. The opening 29e enables him to select a single character. Manifestly any other forms and combinations of openings that may be desired can be provided in the shutter.

The two color screen such as is commonly provided for the final test is held in the frame 43 which has an extension at one end pivotally mounted upon the pivot 31 on the inner face of the partition 6. In one position this two color screen opposes the inner face of the window 15 and in its other position is raised from the window to the position shown in Fig. 3. To thus adjust the screen a manually operated lever 44 is provided pivoted to the rear face of the partition and has an engaging end extending outside of the casing. Pivotally attached to the inner end of this lever 44 is a connecting link 45 the opposite end of which is pivotally attached to a crank extension 43a on the frame 43. The raising of the handle of the lever 44 therefore serves to insert the two color screen into the path of projection, and the depression of the handle of the lever 44 serves to withdraw the screen.

A laterally and vertically movable pointer 46 is provided to enable the refractionist to direct the attention of the patient to any particular character projected on the screen. This pointer is on the upper end of a rack 47 which engages with a pinion 48 on a manually rotatable and slidable stem 49 provided with a knob 50. The stem 49 slides and bears in bearings provided for it on the rear face of the partition 6. A channel member 51 functions to hold the rack 47 and pinion 48 into operative engagement and cause the pointer to follow the lateral movement of the knob 50. A cross piece 52 on the partition restrains the lower end of the guiding channel piece 51 and thus causes the pointer to move in a plane parallel to the face of the partition as the knob 50 is rotated.

Means are provided to project a rotative astigmia test chart. These means are illustrated in Fig. 2, and in detail in Figs. 11 to 13. A rotative cylindrical casing 53 is mounted near the rear end of the projection chamber so that its longitudinal axis is in the central vertical plane of the device and so that it can be swung on a transverse axis to bring its longitudinal axis into coincidence with the axis of the lens system and to remove it from the axis of the lens system. The bottom 53a of this cylindrical member 53 is a transparent T-chart such as is commonly used in tests for astigmia although obviously any other form of chart may be used for the purpose.

To swing the astigmia test chart into and out of the line of projection, a sleeve 54 bears at its outer end in the wall of the projection chamber and a crank piece 55 is provided on the outer end of this sleeve outside the casing. The raising and lowering of the piece 55 therefore serves to rock the sleeve 54. The sleeve terminates short of the center line of the casing and its inner end is fastened to one leg of a U-shaped frame member 56 the opposite end of which is secured to a complementary sleeve member 57 that bears on a stud 58 in the opposite wall of the chamber, the two sleeves 54 and 57 being in alignment. The upper or open end of the cylindrical member 53 bears in a round opening in the bottom of the U-shaped frame member 56. Two braces 59 connected at their rear ends by a cross piece 60 that bears laterally against the cylindrical member 53 near its rear end serve to brace the frame structure and help to support the rotative cylindrical member.

In order to rotate the astigmia test chart the upper or forward end of the cylindrical member is provided with crown gear teeth which mesh with a crown gear 61 on the inner end of a shaft 62 which extends through and bears in the sleeve 54 and has a manually operating knob 63 on its outer end. An index pointer 64 on the knob 63 cooperates with an index to indicate the axis from zero to 180°.

The astigmia test chart therefore has two positions, one where it is out of use as shown in Fig. 11 and one where it is in use as shown in Figs. 12 and 13. A flat spring 65 on the inner face of the chamber wall cooperates with a square portion on the sleeve 57 to hold the astigmia test chart in its two positions. A pin 66 may extend out from the same side wall into the path of one arm of the U-shape member 56 and thus acts as a stop for the parts as the chart is rotated down out of projecting position.

The astigmia test chart can of course be used only when the charts in the slide 40 are not in use. The axis of the sleeves 54 and 57 is therefore so located that the astigmia test chart cannot be rotated into projecting position when the slide 40 is down opposite the window 15. This interference is shown in Fig. 13 where it will be seen that the slide cannot be moved downwardly without hitting the cylindrical rotative holder for the astigmia test chart.

A small light to illuminate the index over which the pointer 64 moves is contained in a socket 67 on the outer face of the casing immediately above the knob 63. The branch circuit from the plug 24 that extends into the front section of the casing provides the current for the illumination of this lamp, being connected thereto through the switch 68 and resistor 69.

The operation of the instrument will be apparent from the above description. By manipulating the knobs 37 and 39 the refractionist is able to adjust the slide so as to bring any chart before the projection window, and the rotation of the knob 30 will bring the desired shutter opening into position to project just the character or characters desired. By rotating and sliding the knob 50 the pointer 46 is brought into any desired position and the raising and lowering of the handle of the lever 44 serves to bring the two color screen into and out of testing position. When it is desired to make a test for astigmatism the knob 37 is rotated so as to elevate the slide above the window, and the handle 55 is then raised to bring the chart 53 into projecting position. Rotation of the knob 63 serves to rotate the astigmia test chart. To control the amount of illumination, the knob 28 of the rheostat is turned.

It will be understood that the specific construction and arrangement of parts shown in the drawings and above described are in no sense essential to the invention but that my invention may be otherwise embodied within the scope of the appended claims.

I claim:

1. A projection device for ophthalmic test characters comprising a housing having a lamp chamber and a projection chamber, an opaque partition between the two chambers having a transmission aperture, a lamp and condensing lenses in the lamp chamber, projection lenses in the projection chamber, the optical axis of the lens system being in line with said aperture, a projection slide, a laterally adjustable guide member for the slide carried by the partition and including means to permit longitudinal adjustment of the slide in the guide, means to adjust the slide longitudinally in the guide in front of the aperture, independent means to adjust the guide member laterally of the partition, and a rotary shutter having a circumferential series of variously shaped openings therein adapted successively to oppose the aperture in the partition and pivoted to the partition between the partition and the guide member.

2. A projection device for ophthalmic test characters comprising a housing having a lamp chamber and a projection chamber, a lamp and condensing lenses in the lamp chamber, projection lenses in the projection chamber, a partition between the two chambers having a transmission aperture in the line of the optical axis of the lens system, an elongated slide operating pinion having bearings in one face of the partition with its axis transverse thereof, manual means for actuating the pinion, a projection slide provided with a rack along at least one edge cooperative with the pinion to feed the slide before the aperture, and a guide member for the slide mounted on the pinion and slidable thereon laterally of the partition.

3. A projection device for ophthalmic test characters comprising a housing having a lamp chamber and a projection chamber, a lamp and condensing lenses in the lamp chamber, projection lenses in the projection chamber, a partition between the two chambers having a transmission aperture in the line of the optical axis of the lens system, an elongated slide operating pinion having bearings in one face of the partition with its axis transverse thereof, manual means for actuating the pinion, a projection slide provided with a rack along at least one edge cooperative with the pinion to feed the slide before the aperture, a guide member for the slide mounted on the pinion and slidable thereon laterally of the partition, manual means including a rod attached to the slide and extending externally of the housing for adjustment of the guide member, and a rotary shutter having a circumferential series of variously shaped openings therein adapted successively to oppose the aperture in the partition and pivoted to the partition between the partition and the guide member.

4. A projection device for ophthalmic test characters comprising a two part housing, a partition separating the two parts and provided with a transmission aperture, the outer face of the partition having a circular recess including the area of the aperture, a circular apertured shutter seated and bearing in the recess and having a pivot extending through the partition, a multi-color screen holder pivoted on said pivot on the opposite face of the partition and adapted to move into and out of line with the aperture, manual means extending externally of the housing for independently rotating the pivot and the screen holder on the pivot, a projection slide, and means for feeding the slide across the aperture.

5. A projection device for ophthalmic test characters comprising a housing having a front projection chamber and a rear lamp chamber, a partition between the two chambers having a transmission aperture, means for holding a projection slide before the aperture, a pointer behind the partition parallel therewith, and manual actuating means for the pointer including a rack on an extension of the pointer, a longitudinally slidable rod mounted transversely in bearings on the rear face of the partition, a pinion on the rod engaging the rack, and means securing the rack and pinion against relative displacement.

6. A projection device for ophthalmic test characters comprising a housing including a front projection chamber and a rear lamp chamber, an opaque partition between the two chambers having a transmission aperture, a lens system mounted in the housing having its optical axis in line with the aperture, a source of illumination in the lamp chamber behind the lens system, a manually operative rack member bearing in a lateral wall and extending interiorly of the projection chamber transversely to the optical axis and having an angular holder on its inner end with a portion parallel to but offset from the axis of the rock member, whereby said portion is adapted in one position to intercept the axis of the lens system and in another position to be out of the axis, and an astigmia test chart mounted in said offset portion of said holder.

7. A projection device for ophthalmic test characters comprising a housing including a front projection chamber and a rear lamp chamber, an opaque partition between the two chambers having a transmission aperture, a lens system mounted in the housing having its optical axis in line with the aperture, a source of illumination in the lamp chamber behind the lens system, a manually operative rock member bearing in a lateral wall and extending interiorly of the projection chamber transversely to the optical axis and having an angular holder on its inner end with a portion parallel to but offset from the axis of the rock member, whereby said portion is adapted in one position to intercept the axis of the lens system and in another position to be out of the axis, an astigmia test chart rotatably mounted in said offset portion of said holder, and means coaxial with the rock member operatively connected with the test chart to rotate the same.

8. A projection device for ophthalmic test characters comprising a housing including a front projection chamber and a rear lamp chamber, an opaque partition between the two chambers having a transmission aperture, a lens system mounted in the housing having its optical axis in line with the aperture, a source of illumination in the lamp chamber behind the lens system, a guide for a projection slide on the outer face of the partition positioned to guide a slide into and out of alinement with the aperture, a manually operative rock member bearing in a lateral wall and extending interiorly of the projection chamber and having an angular holder on its inner end with a portion parallel to but offset from the axis of the rock member, whereby said portion is adapted in one position to intercept the axis of the lens system and in another position to be out of the axis, and an astigmia test chart mounted in said offset portion of said holder.

9. A projection device for ophthalmic test characters comprising a housing having a front projection chamber and a rear lamp chamber, a lens system mounted in the housing, a partition between the two chambers having a transmission aperture in the axis of the lens system, a source of illumination in the lamp chamber behind the lens system, a guide for a projection slide on the outer face of the partition positioned to guide a slide into and out of alinement with the aperture, a manually operative rock member bearing in a lateral wall and extending interiorly of the projection chamber transversely to the optical axis and having an angular holder on its inner end with a portion parallel to but offset from the axis of the rock member, whereby said portion is adapted in one position to interrupt the path of movement of a projection slide in the guide and to intercept the axis of the lens system and in another position to clear the said path of the said axis, an astigmia test chart rotatively mounted in said offset portion of said holder, and means coaxial with the rock member operatively connected with the test chart to rotate the same.

10. A projection device for ophthalmic test characters comprising a housing, a lens system in the housing including condensing lenses and projection lenses, a rock member extending interiorly of and bearing in the housing between the condensing and projection lenses with its axis transverse of the optical axis of the lenses, a transparent chart carried by the rock member in the plane of the optical axis perpendicular to the axis of the rock member but offset from the latter axis, whereby it is adapted to be moved into and out of the axis of the lens system as the member is rocked, and a source of light for the system.

EDWARD J. LUECK.